United States Patent
Kanahara et al.

(10) Patent No.: US 9,748,792 B2
(45) Date of Patent: Aug. 29, 2017

(54) WIRELESS CHARGING SYSTEM

(71) Applicant: HONDA MOTOR CO., LTD., Tokyo (JP)

(72) Inventors: Hirokazu Kanahara, Haga-gun (JP); Masayuki Yamazaki, Utsunomiya (JP); Toshihiro Kojima, Utsunomiya (JP); Shigenori Hiruta, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 63 days.

(21) Appl. No.: 14/745,869

(22) Filed: Jun. 22, 2015

(65) Prior Publication Data
US 2015/0380975 A1    Dec. 31, 2015

(30) Foreign Application Priority Data
Jun. 25, 2014    (JP) .................................. 2014-130546

(51) Int. Cl.
*H02J 7/00*    (2006.01)
*H02J 7/02*    (2016.01)
(Continued)

(52) U.S. Cl.
CPC .............. *H02J 7/025* (2013.01); *H02J 5/005* (2013.01); *H04L 67/12* (2013.01); *H02J 7/0044* (2013.01)

(58) Field of Classification Search
CPC   H02J 7/025; H02J 5/005; H01F 38/14; Y02T 90/122; B60L 11/182; Y02E 60/12
(Continued)

(56) References Cited

U.S. PATENT DOCUMENTS

2006/0061325 A1*  3/2006  Tang .................. H02J 7/025
                                                        320/108
2006/0287763 A1* 12/2006  Ochi .................. G06Q 40/00
                                                        700/231
(Continued)

FOREIGN PATENT DOCUMENTS

DE    102013016887 A1    6/2014
DE    112013001009 T5    11/2014
(Continued)

OTHER PUBLICATIONS

Japanese Office Action with English Translation dated Nov. 22, 2016, 7 pages.
(Continued)

*Primary Examiner* — Arun Williams
(74) *Attorney, Agent, or Firm* — Rankin, Hill & Clark LLP (57) ABSTRACT

A wireless charging system includes a wireless charger includes a power transmission part and a controller, the power transmission part being configured to transmit power to a portable terminal having a power-receiving part in a non-contact manner, the controller being configured to control power transmission performed by the power transmission part and to control a stop of the power transmission; and an in-vehicle wireless communication device having an antenna configured to perform wireless communication with an electronic key of an occupant of the vehicle, wherein the wireless charger is communicably connected to predetermined equipment which is provided to the vehicle, and when wireless communication between the in-vehicle wireless communication device and the electronic key is performed, the controller stops power transmission performed by the power transmission part in a case where a predetermined (Continued)

signal which is transmitted from the predetermined equipment is received before the antenna is driven.

8 Claims, 4 Drawing Sheets

(51) Int. Cl.
    *H04L 29/08*     (2006.01)
    *H02J 5/00*     (2016.01)

(58) Field of Classification Search
    USPC ........................................................ 320/108
    See application file for complete search history.

(56) References Cited

U.S. PATENT DOCUMENTS

| | | | | |
|---|---|---|---|---|
| 2008/0275600 | A1* | 11/2008 | Rask | B60K 6/24 |
| | | | | 701/22 |
| 2008/0315826 | A1* | 12/2008 | Alberth, Jr. | H02J 7/0013 |
| | | | | 320/101 |
| 2009/0021211 | A1* | 1/2009 | Zhang | H02J 7/025 |
| | | | | 320/108 |
| 2010/0072946 | A1* | 3/2010 | Sugano | B60L 3/0046 |
| | | | | 320/108 |
| 2010/0138093 | A1* | 6/2010 | Oku | B60L 11/18 |
| | | | | 701/22 |
| 2012/0153894 | A1* | 6/2012 | Widmer | H04B 5/0037 |
| | | | | 320/108 |
| 2013/0038280 | A1* | 2/2013 | Boundy | B60R 7/04 |
| | | | | 320/108 |
| 2013/0110318 | A1 | 5/2013 | Colja et al. | |
| 2015/0015198 | A1 | 1/2015 | Okada et al. | |

FOREIGN PATENT DOCUMENTS

| | | |
|---|---|---|
| JP | 2004-197649 A | 7/2004 |
| JP | 2010-093957 A | 4/2010 |
| JP | 2012-161235 A | 8/2012 |
| JP | 2013-048517 | 3/2013 |
| JP | 2013-216147 A | 10/2013 |
| JP | 2013-223252 A | 10/2013 |

OTHER PUBLICATIONS

German Office Action with English Translation dated Jan. 18, 2017, 28 pages.

* cited by examiner

WIRELESS CHARGING SYSTEM

CROSS-REFERENCE TO RELATED APPLICATION

Priority is claimed on Japanese Patent Application No. 2014-130546, filed on Jun. 25, 2014, the contents of which are incorporated herein by reference.

BACKGROUND OF THE INVENTION

Field of the Invention

The present invention relates to a wireless charging system.

Description of Related Art

Hitherto, there have been wireless charging systems in which a portable terminal such as a smartphone is placed on a charger having a primary coil built-in, to thereby charge a battery of the portable terminal through a secondary coil of the portable terminal without requiring connection of a cable or the like. However, in such wireless charging systems, there is the possibility of an electromagnetic field radiated from a primary coil influencing, for example, communication used in an electronic key system or the like. On the other hand, a charging device is known in which a charging stop signal is generated by extracting a driving signal of an antenna for performing communication in an electronic key system or the like, and a charging operation of a portable terminal by a wireless power feeding device is temporarily stopped (see, for example, Japanese Unexamined Patent Application, First Publication No. 2013-48517).

SUMMARY OF THE INVENTION

However, according to the charging device of the above related art, a charging stop signal is generated by extracting a driving signal of an antenna, and this charging stop signal is received and then charging is stopped.

For this reason, it may be difficult to lower electromagnetic waves, radiated from a primary coil until the start of actual communication, to a predetermined level or less.

The aspects of the present invention is contrived in view of the foregoing circumstances, and an object thereof is to provide a wireless charging system which is capable of stopping power transmission from a wireless charger to a portable terminal at an appropriate and early timing when communication between an electronic key possessed by an occupant of a vehicle and an in-vehicle wireless communication device is performed.

In order to solve the above problem and achieve such an object, the present invention adopts the following aspects.

(1) According to an aspect of the present invention, a wireless charging system is provided, including: a wireless charger that is disposed inside a vehicle and that includes a power transmission part and a controller, the power transmission part being configured to transmit power to a portable terminal having a power-receiving part in a non-contact manner, the controller being configured to control power transmission performed by the power transmission part and to control a stop of the power transmission; and an in-vehicle wireless communication device having an antenna configured to perform wireless communication with an electronic key of an occupant of the vehicle, wherein the wireless charger is communicably connected to predetermined equipment which is provided to the vehicle, and when wireless communication between the in-vehicle wireless communication device and the electronic key is performed, the controller is configured to stop power transmission performed by the power transmission part in a case where a predetermined signal which is transmitted from the predetermined equipment is received before the antenna is driven.

(2) In the aspect of the above (1), when the predetermined signal is received, the in-vehicle wireless communication device may be configured to perform wireless communication with the electronic key by driving the antenna.

(3) In the aspect of the above (1) or (2), the predetermined equipment may be a door switch that is configured to detect a change in an open or closed state of at least any of doors of the vehicle during in an operating state of a driving source of the vehicle or in an on-state of a power supply, and the predetermined signal may be information indicating an open or closed state of the door of the vehicle.

(4) In the aspect of the above (1), the predetermined equipment may be the in-vehicle wireless communication device, the predetermined signal may be a charging stop request signal which is transmitted from the in-vehicle wireless communication device, and when wireless communication with the electronic key is performed, the in-vehicle wireless communication device may be configured to transmit the charging stop request signal, and then drive the antenna.

(5) In the aspect of the above (4), the in-vehicle wireless communication device may be configured to transmit the charging stop request signal and then drive the antenna at predetermined time intervals.

(6) In the aspect of the above (4), the wireless charger may be configured to transmit a reception confirmation signal when the charging stop request signal is received, and the in-vehicle wireless communication device may be configured to drive the antenna when the reception confirmation signal is received after the transmission of the charging stop request signal.

(7) In the aspect according to any one of the above (1) to (6), the in-vehicle wireless communication device may be disposed inside the vehicle, and may be configured to perform wireless communication with the electronic key when an open or closed state of at least any of doors of the vehicle is changed, and the in-vehicle wireless communication device may include an alarm part that is configured to generate an alarm when the electronic key is not detected.

With the wireless charging system according to the aspect of the above (1), the wireless charger stops the power transmission on the basis of the reception of the predetermined signal which is transmitted from the predetermined equipment before the antenna is driven when wireless communication between the in-vehicle wireless communication device and the electronic key is performed. Therefore, for example, it is possible to extract a driving signal when the antenna is actually driven, or to stop power transmission at an earlier timing than in a case where power transmission is stopped in accordance with a charging stop request signal which is generated using the extracted driving signal as a trigger. Thereby, it is possible to reduce the possibility of the wireless charger influencing wireless communication between the in-vehicle wireless communication device and the electronic key.

Further, in a case of the above (2), a trigger by which the in-vehicle wireless communication device starts wireless communication and a trigger by which the wireless charger stops power transmission are made to be the same as each other, thereby allowing charging to be stopped at an appropriate timing without acquiring the charging stop request signal from the in-vehicle wireless communication device. Thereby, even when the wireless charger is mounted in the vehicle by so-called post installation as an option, it is possible to reduce the possibility of the wireless charger influencing wireless communication between the in-vehicle wireless communication device and the electronic key.

Further, in a case of the above (3), charging is stopped using, as a trigger, the reception of the predetermined signal indicating the open or closed state of the door of the vehicle in a state where there is a high probability of wireless communication between the in-vehicle wireless communication device and the electronic key being performed, that is, an operating state of the driving source of the vehicle or an on-state of the power supply. Therefore, it is possible to more effectively reduce the possibility of the wireless charger influencing the wireless communication between the in-vehicle wireless communication device and the electronic key.

Further, in a case of the above (4), charging is stopped by transmitting the charging stop request signal from a system which has possibility of being influenced by the wireless charger, for example, a system including the in-vehicle wireless communication device, and thereafter, an operation of the system including the in-vehicle wireless communication device is started. Therefore, it is possible to more reliably reduce the possibility of the wireless charger influencing the wireless communication between the in-vehicle wireless communication device and the electronic key.

Further, in a case of the above (5), a standby time of the predetermined time is provided until the antenna is driven after the transmission of the charging stop request signal, and thus it is possible to more reliably reduce the possibility of the wireless charger influencing the wireless communication between the in-vehicle wireless communication device and the electronic key.

Further, in a case of the above (6), the in-vehicle wireless communication device confirms that the wireless charger has received the charging stop request signal and then drives the antenna. Therefore, it is possible to more reliably reduce the possibility of the wireless charger influencing the wireless communication between the in-vehicle wireless communication device and the electronic key.

Further, in a case of the above (7), in the vehicle to which key taking-out alarm control is applied, it is possible to appropriately reduce the possibility of the wireless charger influencing the wireless communication between the in-vehicle wireless communication device and the electronic key, and to prevent an erroneous alarm from being generated. The key taking-out alarm control is control for performing in-vehicle communication in order to confirm the presence of the electronic key when a state changes where there is a high possibility of the electronic key being taken out to the outside of the vehicle by mistake in the operating state of an engine of the vehicle, that is, when an open or closed state of the door of the vehicle is changed, and for generating an alarm when the electronic key is not present in the vehicle.

DESCRIPTION OF EMBODIMENTS

First Embodiment

Hereinafter, a wireless charging system according to a first embodiment of the present invention will be described with reference to the accompanying drawings.

Figure 1:
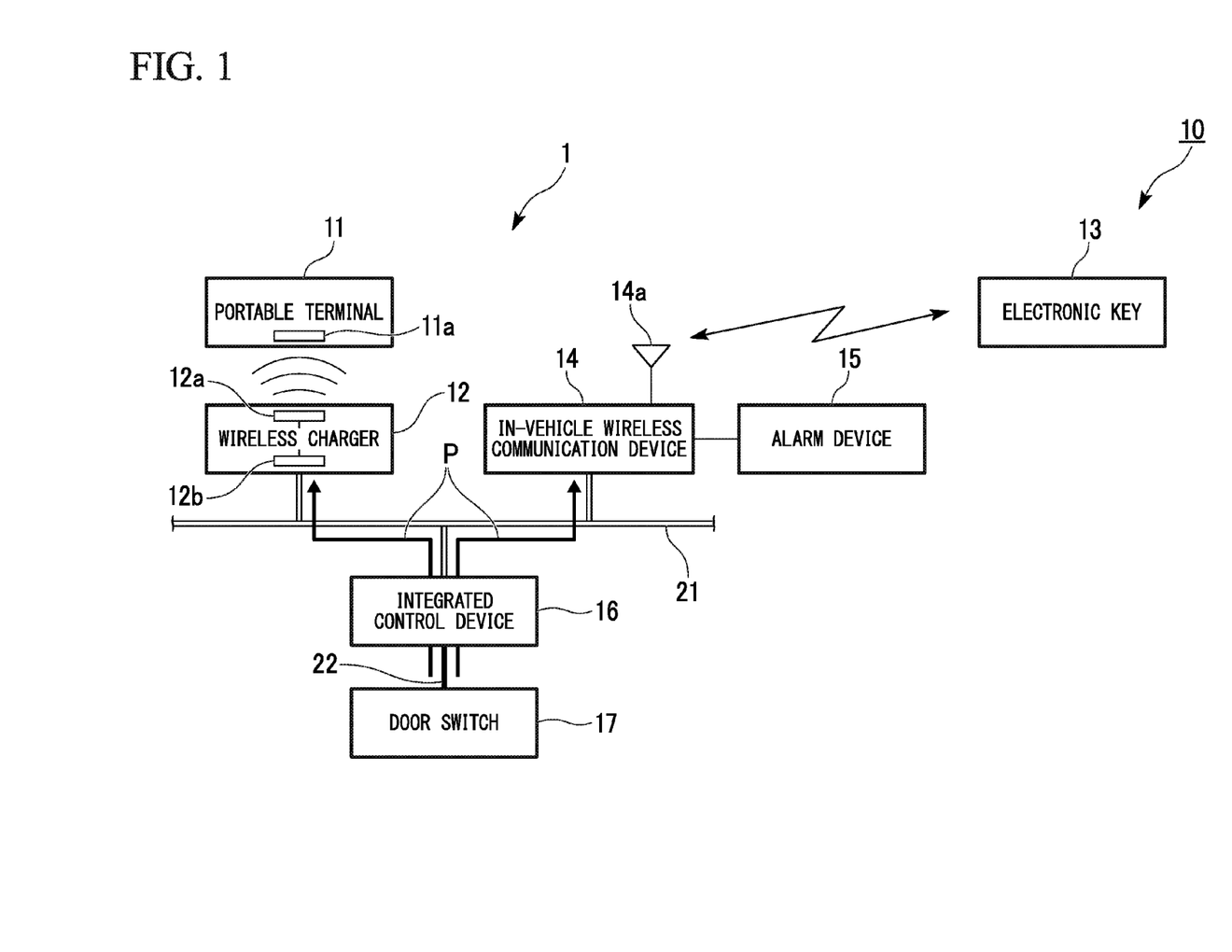
FIG. 1 is a configuration diagram of a wireless charging system according to a first embodiment of the present invention.

A wireless charging system 10 according to the first embodiment is mounted in a vehicle 1. As shown in FIG. 1, the wireless charging system 10 according to the first embodiment includes a wireless charger 12 that transmits power to a portable terminal 11 in a non-contact manner, an in-vehicle wireless communication device 14 that performs wireless communication with an electronic key 13, an alarm device 15, an integrated control device 16, and a door switch 17. The wireless charging system 10 is configured such that the wireless charger 12, the in-vehicle wireless communication device 14, and the integrated control device 16 are mutually communicably connected to each other by a communication line 21 of the vehicle 1 such as, for example, a CAN (Controller Area Network) communication line. The wireless charging system 10 connects the door switch 17 to the integrated control device 16 through, for example, a hard wire 22.

The portable terminal 11 is, for example, an information terminal or the like of an occupant of the vehicle 1. The portable terminal 11 includes a power-receiving part 11a that receives power which is transmitted from the wireless charger 12. The power-receiving part 11a includes, for example, an antenna (not shown) for receiving microwaves which are output from the wireless charger 12. The power-receiving part 11a receives power by converting microwaves which are received by the antenna into a current.

The wireless charger 12 is disposed inside a vehicle. The wireless charger 12 includes, for example, a power transmission part 12a and a controller 12b. The power transmission part 12a includes, for example, an antenna (not shown) for transmitting microwaves toward the portable terminal 11. The power transmission part 12a transmits power by converting a current into microwaves through the antenna. The controller 12b controls an operation of the power transmission part 12a in accordance with a predetermined signal P which is received from the outside through the communication line 21 of a vehicle.

The electronic key 13 is, for example, a communication terminal of an occupant of the vehicle 1, and performs wireless communication with the in-vehicle wireless communication device 14. The electronic key 13 transmits, for example, a signal responding to a request signal which is transmitted from the in-vehicle wireless communication device 14, a signal for giving an instruction for an operation of predetermined in-vehicle equipment, and the like, together with unique identification information. The operation of the predetermined in-vehicle equipment is, for example, start-up or stop of a driving source (such as, for example, an internal-combustion engine or a motor) of the vehicle 1, unlocking or locking of a door (not shown) based on driving of a door lock unit (not shown) of a vehicle 1, and the like.

The in-vehicle wireless communication device 14 includes an antenna 14a for performing wireless communication with the electronic key 13. The in-vehicle wireless communication device 14 transmits a request signal to the inside of the vehicle 1 at a predetermined timing, for example, when the power supply position of the vehicle 1 is switched from an off-state to an on-state, when all the doors are set to a closed state from a state where any of a plurality of doors provided to the vehicle 1 were in opened state during a situation when the driving source of the vehicle 1 is in an operating state or the power supply thereof is in an on-state, and the like. The in-vehicle wireless communication device 14 controls driving of the antenna 14a in accordance with the predetermined signal P which is received from the outside through the communication line 21 of the vehicle 1.

The in-vehicle wireless communication device 14 is connected to, for example, an alarm device 15. The in-vehicle wireless communication device 14 drives the alarm device 15 when the presence of the electronic key 13 is not detected in a predetermined state, or the like. For example, the in-vehicle wireless communication device 14 transmits a request signal to the inside of the vehicle 1 when all the doors are set to be in a closed state from a state where any of a plurality of doors provided to the vehicle 1 were in opened state, in an operating state of the driving source (such as, for example, an internal-combustion engine or a motor) of the vehicle 1. When a response signal which is transmitted from the electronic key 13 in response to the request signal is not able to be received, the in-vehicle wireless communication device 14 then determines that there is a possibility of the electronic key 13 being taken out to the outside of a vehicle by mistake, and drives the alarm device 15.

The alarm device 15 is, for example, a speaker or the like for outputting an alarm based on a voice or an electronic sound. The alarm device 15 outputs an alarm in accordance with an instruction of the in-vehicle wireless communication device 14.

When the predetermined signal P which is output from the door switch 17 is received, the integrated control device 16 transmits the predetermined signal P to each of the wireless charger 12 and the in-vehicle wireless communication device 14 through the communication line 21 of the vehicle 1. The integrated control device 16 uses the predetermined signal P as, for example, information signal or the like indicating that all the doors are set to be in a closed state from a state where any of a plurality of doors provided to the vehicle 1 were in the opened state.

The door switch 17 outputs the predetermined signal P indicating information of an open or closed state of each of a plurality of doors of the vehicle 1, for example, a change from an open state to a closed state, or the like.

The wireless charging system 10 according to the first embodiment includes the above configuration. Hereinafter, the operation of the wireless charging system 10 will be described.

Figure 2:
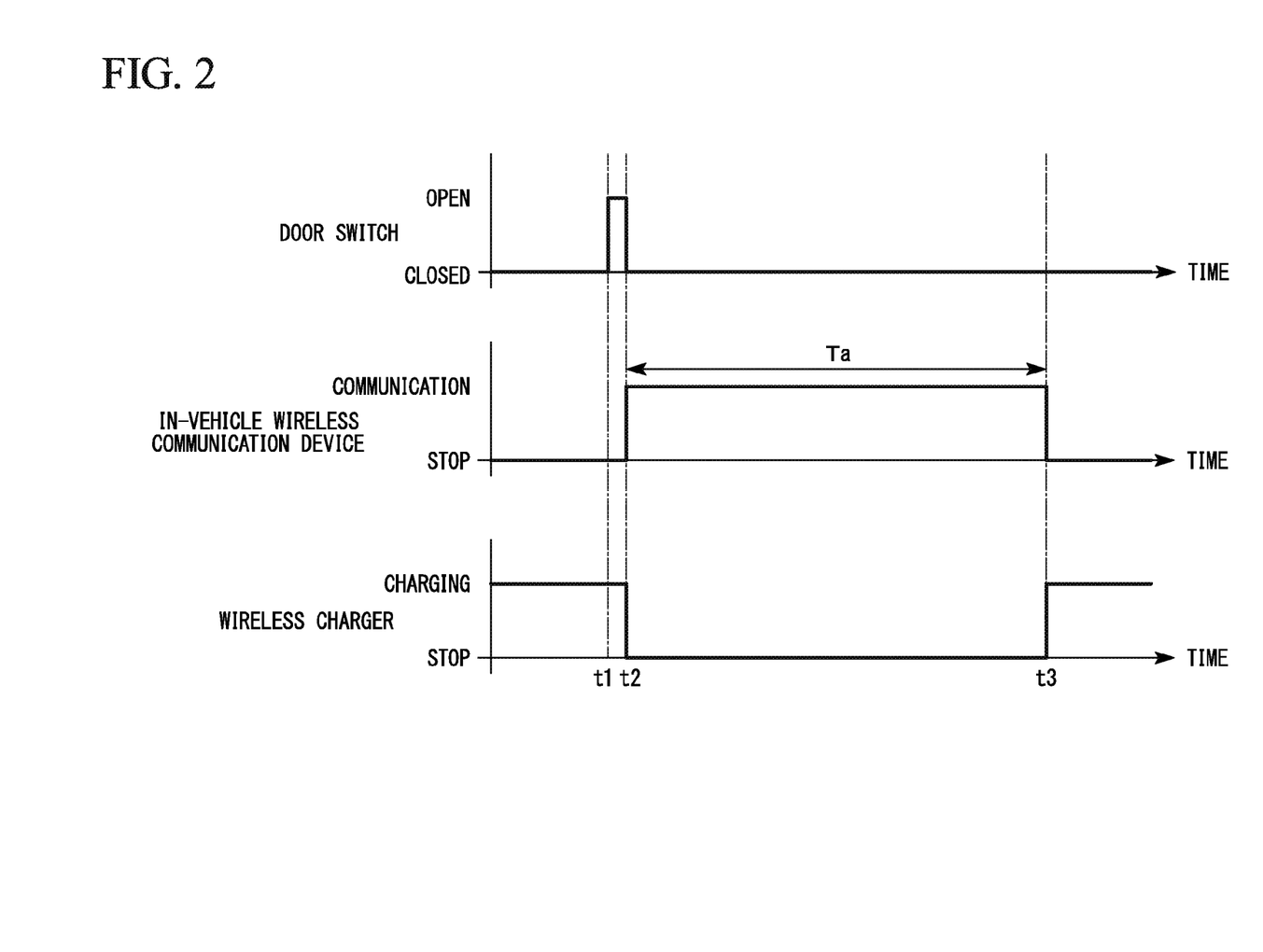
FIG. 2 is a timing chart illustrating operation examples of a door switch, an in-vehicle wireless communication device, and a wireless charger in the wireless charging system according to the first embodiment of the present invention.

First, before time t1 shown in FIG. 2, when a predetermined signal indicating that any of the doors of the vehicle 1 are open is not output from the door switch 17, and wireless communication between the in-vehicle wireless communication device 14 and the electronic key 13 is stopped, the controller 12b permits the power transmission part 12a to transmit power. In association therewith, the wireless charger 12 executes charging for transmitting power to the portable terminal 11 in a non-contact manner.

Next, at time t1, when at least any of the plurality of doors of the vehicle 1 is set to be in an open state, the door switch 17 starts to output the predetermined signal P, and continues to output the predetermined signal P until all the doors are set to be in a closed state. When the predetermined signal P which is output from the door switch 17 is received, the integrated control device 16 transmits the predetermined signal P to each of the wireless charger 12 and the in-vehicle wireless communication device 14 through the communication line 21 of the vehicle 1.

Next, at time t2, when all the doors of the vehicle 1 are set to be in a closed state, the door switch 17 stops outputting the predetermined signal P. When the predetermined signal P which is transmitted from the integrated control device 16 is received before time t2, the controller 12b of the wireless charger 12 prohibits the power transmission part 12a from transmitting power at time t2. In association therewith, the wireless charger 12 stops charging the portable terminal 11. In addition, when the predetermined signal P which is transmitted from the integrated control device 16 is received before time t2, the in-vehicle wireless communication device 14 performs wireless communication with the electronic key 13 by driving the antenna 14a at time t2.

Next, at time t3, the in-vehicle wireless communication device 14 stops wireless communication with the electronic key 13 by stopping driving the antenna 14a at a point in time when wireless communication with the electronic key 13 has started and then a predetermined time Ta (for example, several seconds or the like) has elapsed. In addition, at time t3, the wireless charger 12 resumes charging the portable terminal 11 at a point in time when the charging of the portable terminal is stopped and then the predetermined time Ta (for example, several seconds or the like) has elapsed. In the in-vehicle wireless communication device 14 and the wireless charger 12, the predetermined time Ta is set to, for example, a time or the like required for the completion of predetermined wireless communication between the in-vehicle wireless communication device 14 and the electronic key 13 which is started when any of the doors of the vehicle 1 is opened.

As described above, according to the wireless charging system 10 of the first embodiment, the wireless charger 12 stops power transmission on the basis of the reception of the predetermined signal P which is transmitted from the door switch 17 or the integrated control device 16 before the antenna 14a is driven when wireless communication between the in-vehicle wireless communication device 14 and the electronic key 13 is performed. Therefore, for example, it is possible to extract a driving signal when the antenna 14a is actually driven, or to stop power transmission at an earlier timing than in a case where power transmission is stopped in accordance with a charging stop request signal which is generated using the extracted driving signal as a trigger. Thereby, it is possible to reduce the possibility of the wireless charger 12 influencing wireless communication between the in-vehicle wireless communication device 14 and the electronic key 13.

Further, a trigger by which the in-vehicle wireless communication device 14 starts wireless communication and a trigger by which the wireless charger 12 stops power transmission are made to be the same as each other, thereby allowing charging to be stopped at an appropriate timing without acquiring the charging stop request signal from the in-vehicle wireless communication device 14. Thereby, even in a case the wireless charger 12 is mounted in the vehicle 1 by so-called post installation as an option, it is possible to reduce the possibility of the wireless charger 12 influencing wireless communication between the in-vehicle wireless communication device 14 and the electronic key 13.

Further, since charging is stopped using, as a trigger, the reception of the predetermined signal P indicating that all the doors are set to be in a closed state from a state where there is a high probability of wireless communication between the in-vehicle wireless communication device 14 and the electronic key 13 being performed, that is, a state where any of the plurality of doors provided to the vehicle 1 are open, it is possible to more effectively reduce the possibility of the wireless charger 12 influencing the wireless communication.

Further, in the vehicle 1 to which key taking-out alarm control is applied, it is possible to appropriately reduce the possibility of the wireless charger 12 influencing the wireless communication between the in-vehicle wireless communication device 14 and the electronic key 13, and to prevent an erroneous alarm from being generated. The key taking-out alarm control is control for performing in-vehicle communication in order to confirm the presence of the electronic key 13 when all the doors are set to be in a closed state from a state where there is a high possibility of the electronic key 13 being taken out to the outside of the vehicle by mistake in an operating state of a driving source (such as, for example, an internal-combustion engine or a motor) of the vehicle 1, that is, a state where any of the plurality of doors provided to the vehicle 1 are open, and for generating an alarm when the electronic key 13 is not present in the vehicle.

Second Embodiment

Hereinafter, a wireless charging system according to a second embodiment of the present invention will be described with reference to the accompanying drawings.

Figure 3:
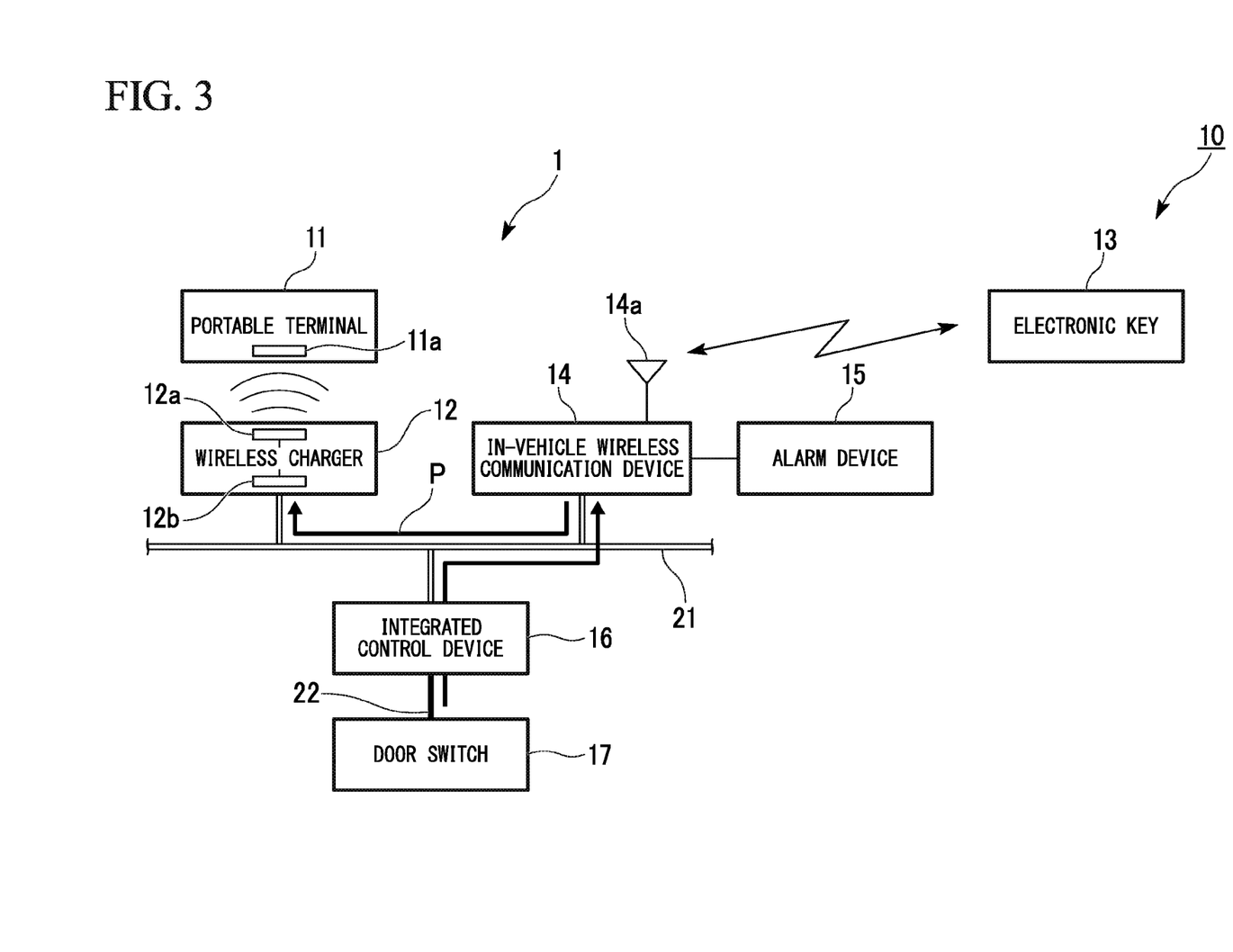
FIG. 3 is a configuration diagram of a wireless charging system according to a second embodiment of the present invention.

As shown in FIG. 3, a wireless charging system 10 according to the second embodiment has the same configuration as that of the wireless charging system 10 according to the above-mentioned first embodiment. An operation of the wireless charging system 10 according to the second embodiment is different from the operation of the wireless charging system 10 according to the above-mentioned first embodiment, in that the predetermined signal P is output by the in-vehicle wireless communication device 14, instead of the door switch 17 and the integrated control device 16.

Hereinafter, the operation of the wireless charging system 10 according to the second embodiment will be described.

Figure 4:
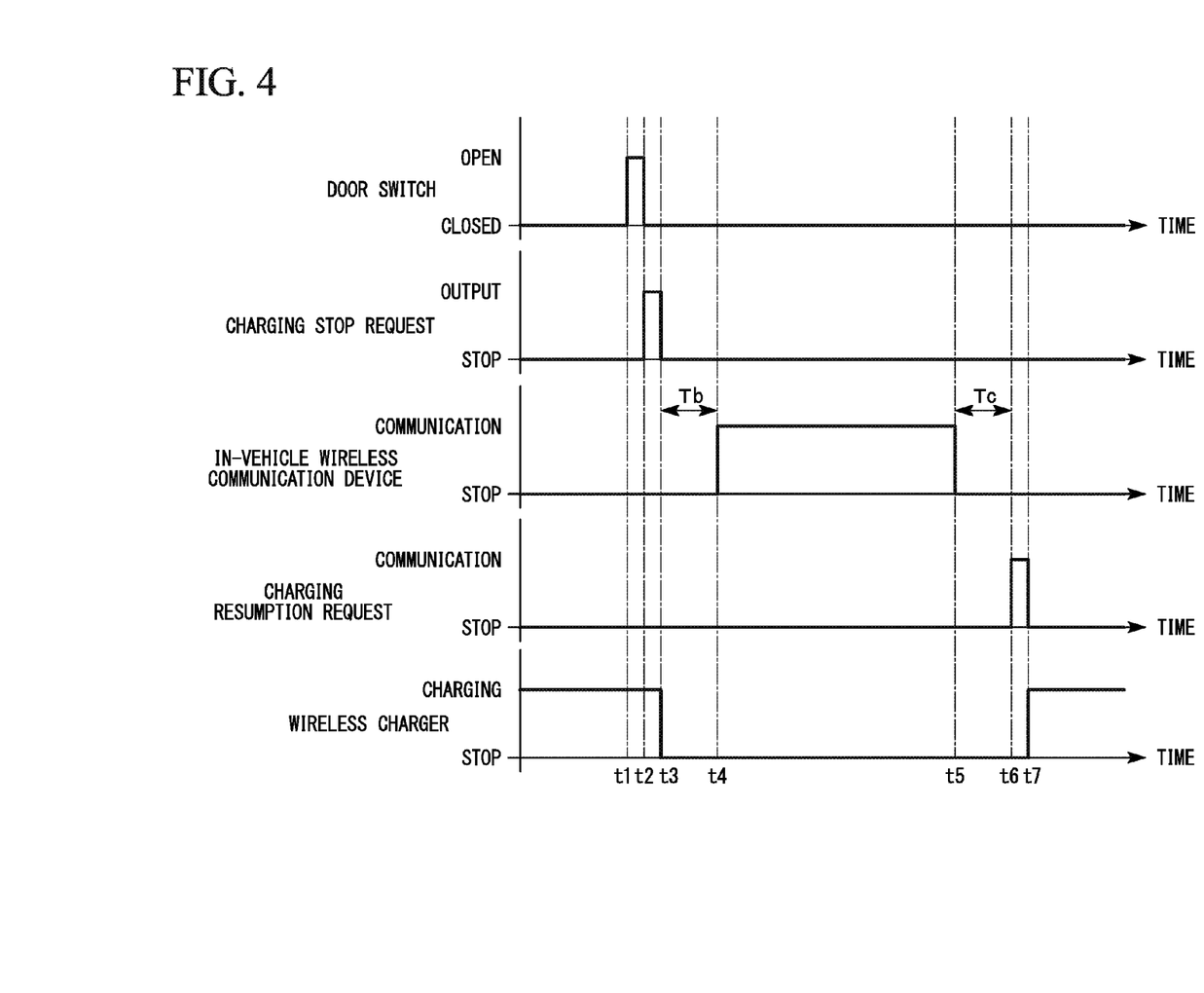
FIG. 4 is a timing chart illustrating operation examples of a door switch, an in-vehicle wireless communication device, and a wireless charger in the wireless charging system according to the second embodiment of the present invention.

First, before time t1 shown in FIG. 4, when the predetermined signal P (that is, charging stop request signal) for requesting the charging stop of the wireless charger 12 is not output from the in-vehicle wireless communication device 14, and wireless communication between the in-vehicle wireless communication device 14 and the electronic key 13 is stopped, the controller 12b permits the power transmission part 12a to transmit power. In association therewith, the wireless charger 12 executes charging for transmitting power to the portable terminal 11 in a non-contact manner.

Next, at time t1, when at least any of the plurality of doors of the vehicle 1 is set to be in an open state, the door switch 17 starts to output information signal (open signal) indicating that any of the doors of the vehicle 1 is in an open state, and continues to output the open signal until all the doors are set to be in a closed state. When the open signal which is output from the door switch 17 is received, the integrated control device 16 transmits the open signal to the in-vehicle wireless communication device 14 through the communication line 21 of the vehicle 1.

Next, at time t2, when all the doors of the vehicle 1 are set to be in a closed state, the door switch 17 stops outputting the open signal. When the open signal which is transmitted from the integrated control device 16 is received before time t2, the in-vehicle wireless communication device 14 starts to transmit the predetermined signal P (that is, charging stop request signal) to the wireless charger 12 through the communication line 21 of the vehicle 1 at time t2.

Next, at time t3, when the predetermined signal P which is transmitted from the in-vehicle wireless communication device 14 is received, the controller 12b of the wireless charger 12 prohibits the power transmission part 12a from transmitting power. In association therewith, the wireless charger 12 stops charging the portable terminal 11.

Next, at time t4, the in-vehicle wireless communication device 14 transmits the predetermined signal P (that is, charging stop request signal) to the wireless charger 12, and then performs wireless communication with the electronic key 13 by driving the antenna 14a at predetermined time intervals Tb.

Next, at time t5, the in-vehicle wireless communication device 14 stops driving the antenna 14a at a point in time when the wireless communication with the electronic key 13 has started and then a predetermined time (for example, several seconds) has elapsed, and thus stops the wireless communication with the electronic key 13.

Next, at time t6, the in-vehicle wireless communication device 14 stops the wireless communication with the electronic key 13, and then transmits a signal (that is, charging resumption request signal) for requesting charging resumption to the wireless charger 12 through the communication line 21 of the vehicle 1 at predetermined time intervals Tc.

Next, at time t7, when the charging resumption request signal which is transmitted from the in-vehicle wireless communication device 14 is received, the controller 12b of the wireless charger 12 permits the power transmission part 12a to transmit power. In association therewith, the wireless charger 12 resumes charging the portable terminal 11.

As described above, according to the wireless charging system 10 of the second embodiment, the wireless charger 12 stops the power transmission on the basis of the reception of the predetermined signal P (charging stop request signal) which is transmitted from the in-vehicle wireless communication device 14 before the antenna 14a is driven when the wireless communication between the in-vehicle wireless communication device 14 and the electronic key 13 is performed. Therefore, for example, it is possible to extract the driving signal when the antenna 14a is actually driven, or to stop the power transmission at an earlier timing than in a case where the power transmission is stopped in accordance with the charging stop request signal which is generated using the extracted driving signal as a trigger. Thereby, it is possible to reduce the possibility of the wireless charger 12 influencing the wireless communication between the in-vehicle wireless communication device 14 and the electronic key 13.

Further, charging is stopped by transmitting the charging stop request signal from a system which has possibility of being influenced by the wireless charger 12, that is, an electronic key system including the in-vehicle wireless communication device 14, and thereafter, an operation of the electronic key system is started. Therefore, it is possible to more reliably reduce the possibility of the wireless charger 12 influencing the wireless communication between the in-vehicle wireless communication device 14 and the electronic key 13.

Further, the in-vehicle wireless communication device 14 is provided with a standby time of the predetermined time interval Tb until the charging stop request signal is transmitted and then the antenna 14a is driven, and thus it is possible to more reliably reduce the possibility of the wireless charger 12 influencing the wireless communication between the in-vehicle wireless communication device 14 and the electronic key 13.

Hereinafter, a modification example will be described.

In the above-mentioned second embodiment, the in-vehicle wireless communication device 14 transmits the predetermined signal P (that is, charging stop request signal) to the wireless charger 12, and then drives the antenna 14a at the predetermined time intervals Tb, but there is no limitation thereto. For example, the in-vehicle wireless communication device 14 may drive the antenna 14a when a reception confirmation signal is received from the wireless charger 12 through the communication line 21 of the vehicle 1.

In this case, when the predetermined signal P which is transmitted from the in-vehicle wireless communication device 14 is received, the controller 12b of the wireless charger 12 prohibits the power transmission part 12a from transmitting power, and transmits the reception confirmation signal to the in-vehicle wireless communication device 14 through the communication line 21 of the vehicle 1.

When the charging stop request signal is transmitted and then the reception confirmation signal is received, the in-vehicle wireless communication device 14 performs wireless communication with the electronic key 13 by driving the antenna 14a.

According to this modification example, since the in-vehicle wireless communication device 14 drives the antenna 14a after the wireless charger 12 confirms that the charging stop request signal is received, it is possible to more reliably reduce the possibility of the wireless charger 12 influencing the wireless communication between the in-vehicle wireless communication device 14 and the electronic key 13.

In the above-mentioned first embodiment, the wireless charger 12 is configured such that, for example, when the power supply position of the vehicle 1 is switched from an off-state to a state where at least an electrical component is turned on (ACC ON), the power supply is turned on. With such a configuration, the power supply of the wireless charger 12 is not required to be turned on or turned off individually, and convenience increases, but there is no limitation thereto. That is, the power supply of the wireless charger 12 may be configured to be turned on or turned off regardless of the power supply position of the vehicle 1, and thus the degree of freedom increases. Here, a timing at which there is a high probability of the wireless communication between the in-vehicle wireless communication device 14 and the electronic key 13 being performed includes, for example, a timing at which a starting switch (not shown) of the vehicle 1 is switched from an off-state to an on-state (ACC ON) of the electrical component or other positions (such as IG ON). Therefore, for example, in a case when the power supply position of the vehicle 1 is switched from an off-state to an on (ACC ON) state of at least the electrical component, it may be configured to output the predetermined signal P to the in-vehicle wireless communication device 14 for the purpose of the authentication of the electronic key 13 from a power supply control device (not shown) of the vehicle 1. In this case, in addition to the door switch 17 or instead of the door switch 17, the power supply control device (not shown) of the vehicle 1 may output the predetermined signal P as information indicating that an operation for switching the power supply position of the vehicle 1 is performed, to the wireless charger 12 and the in-vehicle wireless communication device 14.

In the first embodiment and the second embodiment mentioned above, the wireless charger 12 transmits power through the transmission of microwaves, but there is no limitation thereto. The wireless charger 12 may transmit power through another aspect. For example, the wireless charger 12 may transmit power using electromagnetic induction based on a coil. In this case, the power transmission part 12a of the wireless charger 12 includes a primary coil, and the power-receiving part 11a of the portable terminal 11 includes a secondary coil. The wireless charger 12 causes an alternating current to flow to the primary coil, and generates an alternating current based on electromagnetic induction in the secondary coil, to thereby transmit power.

In the first embodiment and the second embodiment mentioned above, the wireless charger 12 stops the power transmission performed by the power transmission part 12a when the wireless communication between the in-vehicle wireless communication device 14 and the electronic key 13 is performed, but there is no limitation thereto. For example, when the wireless communication between the in-vehicle wireless communication device 14 and the electronic key 13 is performed, the wireless charger 12 may lower a level of the power transmission performed by the power transmission part 12a to less than a predetermined value having no influence on wireless communication.

The embodiments of the present invention have been presented by way of example only, and are not intended to limit the scope of the invention. Indeed, these embodiments described herein may be embodied in a variety of other forms; furthermore, various omissions, substitutions and changes in the form of the embodiments described herein may be made without departing from the spirit of the inventions. The appended claims and their equivalents are intended to cover such forms or modifications as would fall within the scope and spirit of the invention.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:
1. A wireless charging system, comprising:
a wireless charger that is disposed inside a vehicle and that includes a power transmission part and a controller, the power transmission part being configured to transmit power to a portable terminal having a power-receiving part in a non-contact manner, the controller being configured to control power transmission performed by the power transmission part and to control a stop of power transmission; and
an in-vehicle wireless communication device having an antenna configured to perform wireless communication with an electronic key of an occupant of the vehicle,
wherein the wireless charger is communicably connected to a door switch that is configured to detect a change in an open or closed state of at least any of doors of the vehicle and that is configured to output a predetermined signal, and the controller is configured to stop power transmission performed by the power transmission part in a case it is detected that a state in which any of the doors is in the open state has changed to a state in which all of the doors are in the closed state by referring to the predetermined signal received from the door switch before the antenna is driven.

2. The wireless charging system according to claim 1, wherein when the predetermined signal is received, the in-vehicle wireless communication device is configured to perform wireless communication with the electronic key by driving the antenna.

3. The wireless charging system according to claim 2, wherein the door switch is configured to detect the change in the open or closed state of at least any of doors of the vehicle during an operating state of a driving source of the vehicle or an on-state of a power supply, and the predetermined signal is information indicating the open or closed state of the door of the vehicle.

4. The wireless charging system according to claim 3, wherein the in-vehicle wireless communication device is disposed inside the vehicle, and is configured to perform wireless communication with the electronic key when the open or closed state of at least any of doors of the vehicle is changed, and the in-vehicle wireless communication device includes an alarm part that is configured to generate an alarm when the electronic key is not detected.

5. The wireless charging system according to claim 2, wherein the in-vehicle wireless communication device is disposed inside the vehicle, and is configured to perform wireless communication with the electronic key when the open or closed state of at least any of doors of the vehicle is changed, and the in-vehicle wireless communication device includes an alarm part that is configured to generate an alarm when the electronic key is not detected.

6. The wireless charging system according to claim 1, wherein the door switch is configured to detect the change in the open or closed state of at least any of doors of the vehicle during an operating state of a driving source of the vehicle or an on-state of a power supply, and the predetermined signal is information indicating the open or closed state of the door of the vehicle.

7. The wireless charging system according to claim 6, wherein the in-vehicle wireless communication device is disposed inside the vehicle, and is configured to perform wireless communication with the electronic key when the open or closed state of at least any of doors of the vehicle is changed, and the in-vehicle wireless communication device includes an alarm part that is configured to generate an alarm when the electronic key is not detected.

8. The wireless charging system according to claim 1, wherein the in-vehicle wireless communication device is disposed inside the vehicle, and is configured to perform wireless communication with the electronic key when the open or closed state of at least any of doors of the vehicle is changed, and the in-vehicle wireless communication device includes an alarm part that is configured to generate an alarm when the electronic key is not detected.

* * * * *